(12) United States Patent
Chu et al.

(10) Patent No.: US 11,862,968 B2
(45) Date of Patent: Jan. 2, 2024

(54) CIRCUIT AND METHOD FOR HIGH VOLTAGE TOLERANT ESD PROTECTION

(71) Applicant: Taiwan Semiconductor Manufacturing Company Ltd., Hsinchu (TW)

(72) Inventors: Li-Wei Chu, Hsinchu (TW); Tao Yi Hung, Hsinchu (TW); Chia-Hui Chen, Hsinchu (TW); Wun-Jie Lin, Hsinchu (TW); Jam-Wem Lee, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 17/727,022

(22) Filed: Apr. 22, 2022

(65) Prior Publication Data

US 2023/0344221 A1  Oct. 26, 2023

(51) Int. Cl.
*H02H 9/04* (2006.01)
(52) U.S. Cl.
CPC .................................. *H02H 9/046* (2013.01)
(58) Field of Classification Search
CPC ....................................................... H02H 9/046
USPC ............................................................ 361/56
See application file for complete search history.

(56) References Cited

U.S. PATENT DOCUMENTS

| | | | |
|---|---|---|---|
| 9,172,244 B1* | 10/2015 | Ma | H01L 21/8234 |
| 2007/0030610 A1* | 2/2007 | Ker | H02H 9/046 |
| | | | 361/56 |
| 2010/0103570 A1* | 4/2010 | Song | H01L 27/0262 |
| | | | 257/E29.211 |
| 2011/0194218 A1* | 8/2011 | Chen | H02H 9/046 |
| | | | 361/56 |
| 2014/0062979 A1* | 3/2014 | Liu | G11C 19/184 |
| | | | 345/204 |
| 2019/0173471 A1* | 6/2019 | Chen | H03K 3/356113 |
| 2020/0251466 A1* | 8/2020 | Stockinger | H01L 27/0727 |
| 2021/0013873 A1* | 1/2021 | Chen | H03K 19/00315 |
| 2022/0302699 A1* | 9/2022 | Chen | H01L 27/0285 |

* cited by examiner

*Primary Examiner* — Dharti H Patel
(74) *Attorney, Agent, or Firm* — FOLEY & LARDNER LLP (57) ABSTRACT

In some aspects of the present disclosure, an electrostatic discharge (ESD) protection circuit is disclosed. In some aspects, the ESD protection circuit includes a first transistor coupled to a pad, a second transistor coupled between the first transistor and ground, a stack of transistors coupled to the first transistor, and an ESD clamp coupled between the stack of transistors and the ground.

19 Claims, 8 Drawing Sheets

710 — Receive, at a pad coupled to a first transistor, an ESD voltage, wherein the first transistor is coupled to a second transistor 720 — Disable a first switch coupled to a gate of the first transistor and a second switch coupled to a gate of the second transistor 730 — Discharge a first current associated with the ESD voltage through the first transistor and the second transistor 740 — Induce a second current through a substrate of the first transistor and the second transistor

CIRCUIT AND METHOD FOR HIGH VOLTAGE TOLERANT ESD PROTECTION

BACKGROUND

Catastrophic failure can be a failure in an electrostatic discharge (ESD) sensitive device that is permanent. The ESD event may cause a metal melt, junction breakdown or oxide failure. A latent defect can develop when an ESD sensitive device is exposed to an ESD event and is partially degraded. The ESD sensitive device may continue to perform its intended function, and the failure may not be detected by normal inspection. However, intermittent or permanent failures may occur subsequent to a latent defect forming.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure provides various embodiments of an ESD protection circuit and method that improve protection of ESD-sensitive circuits. In some embodiments, during an ESD event (e.g., in response to an ESD pulse applied at a pad coupled to a first transistor and a second transistor), a stack of transistors and an ESD clamp coupled to a gate of the first transistor are enabled. In some embodiments, after the stack of transistors and the ESD clamp are enabled, a gate voltage of the first transistor tracks a ground voltage. That is, the stack of transistors and the ESD clamp may cause a voltage of the gate of the first transistor to be a fixed voltage offset from the ground. In some embodiments, during the ESD event, a parasitic negative-positive-negative (NPN) bipolar transistor in the substrate of the first and second transistors turns on and discharges current from the ESD pulse. In some embodiments, the mechanism by which the parasitic NPN transistor discharges current is gate-induced drain leakage (GIDL), which is dependent on the voltage at the gate of the first transistor. In some embodiments, because the gate voltage of first transistor tracks the ground voltage, the voltage of the gate of the first transistor is lower than when the gate voltage of first transistor tracks the pad voltage. This means that, via the GIDL mechanism, the parasitic NPN transistor in the substrate of the first and second transistors can discharge more current than when the gate voltage of the first transistor tracks the pad voltage.

Advantageously, embodiments of the disclosed memory circuit, method, and device can achieve several benefits. By discharging more current via the substrate, the ESD protection circuit can reduce a voltage across the pad and the ground during an ESD event, and, ultimately, across ESD-sensitive circuits coupled between the pad and the ground during the ESD event. The reduction in the voltage is with respect to embodiments that lack the stack of transistors and the ESD clamp. Thus, the ESD protection circuit more effectively protects ESD-sensitive circuits compared to embodiments that lack the improvements disclosed herein.

Figure 1:
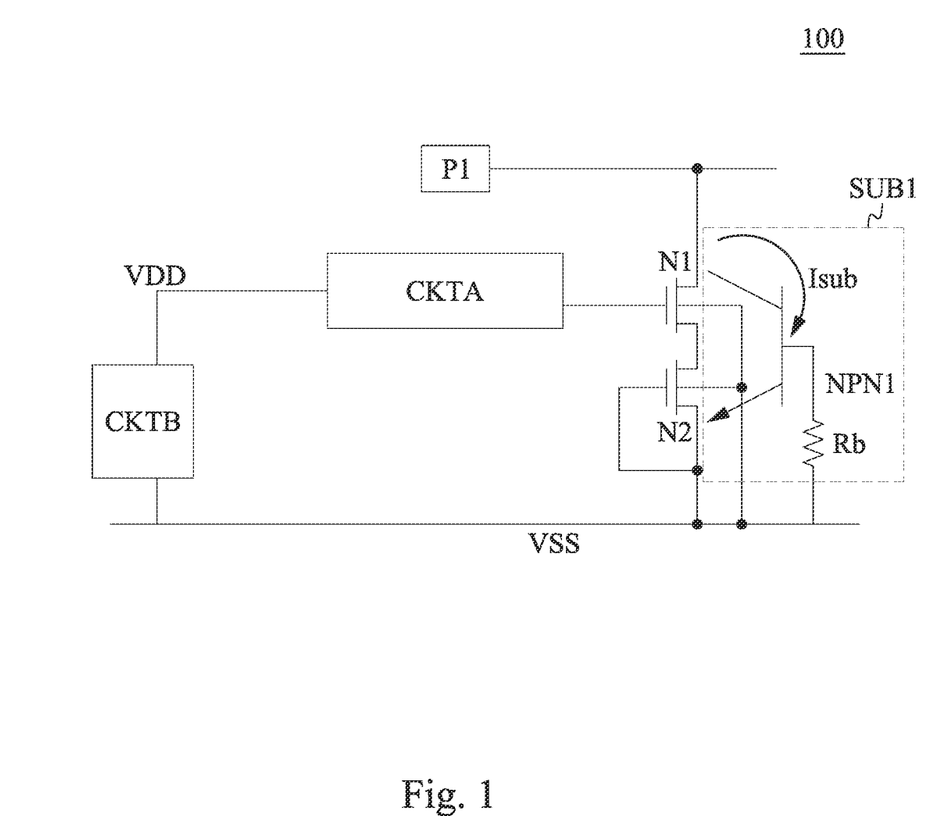
FIG. 1 illustrates an ESD protection circuit, in accordance with some embodiments of the present disclosure.

FIG. 1 illustrates an electrostatic discharge (ESD) protection circuit 100, in accordance with some embodiments of the present disclosure. The ESD protection circuit 100 can designed, configured, and operated to improve ESD protection of an ESD-sensitive circuit by reducing a voltage that can be generated across two terminals of the ESD-sensitive circuit during an ESD event. The ESD-sensitive circuit can be a memory circuit, a logic circuit, or any circuit sensitive to an ESD event. The ESD protection circuit 100 and the ESD-sensitive circuit can be a part of a same integrated circuit (IC), die, three-dimensional die (3D-die), system-on-a-chip (SoC), module, or printed circuit board (PCB) assembly.

The ESD protection circuit 100 includes a transistor N1 coupled to a pad P1. The pad P1 can be an input/output (I/O) pad. The transistor N1 can be referred to as a device or transistor device. The pad P1 may be referred to as a pad terminal, an I/O terminal, or an I/O node. In some embodiments, the ESD protection circuit 100 is part of a high voltage tolerant IC design where the ESD protection device is rated higher than process specified operation voltage. In some embodiments, the transistor N1 may be rated for a first voltage, whereas the ESD protection device, as well as other circuits coupled between the pad P1 and ground, may be rated for a second voltage that is higher than the first voltage. In other words, an operation voltage of the transistor N1 may be lower than an operational voltage for the pad P1. In some embodiments, a ratio of an operation voltage of the transistor N1 and an operation voltage of the pad P1 is 0.85, less than 0.85, 0.7, less than 0.7, 0.5, less than 0.5, or any other value or range between 0 and 1. In some embodiments, the transistor N1 is rated for 1.2V (e.g., N1 is a process specified 1.2V device) and the pad P1 is rated for 1.8V. The transistor N1 and the pad P1 can be rated for any other voltage values or ranges without departing from the scope of the present disclosure.

The transistor N1 can be a metal-oxide semiconductor field-effect transistor (MOSFET), an n-type MOSFET (an NMOS transistor), a p-type MOSFET (a PMOS transistor), a silicon-on-insulate (SOI) MOSFET, a bipolar junction transistor (BJT), or any other transistor suitable for use in memory structures. An NMOS transistor can be chosen for the transistor N1 for applications where speed is a concern because, in some embodiments, read and write operations are faster using an NMOS transistor than using a PMOS transistor. Specifically, in some embodiments, the mobility of electrons, which are carriers in the case of an NMOS transistor, is about two times greater than that of holes, which are the carriers of the PMOS transistor. A PMOS transistor can be chosen for the transistor N1 for applications where variation, cost, or noise is a concern because, in some embodiments, PMOS technology is highly controllable, low-cost process with good yield and high noise immunity as compared to NMOS technology.

The transistor N1 can be any of various transistor types while remaining within the scope of the present disclosure. The transistor N1 can have a MOSFET device type of standard threshold voltage (SVT), low threshold voltage (LVT), high threshold voltage (HVT), high voltage (HV), input/output (IO), or any of various other MOS device types.

The transistor N1 includes a number of ports. Each of the ports can also be referred to as a terminal. The transistor N1 can include a drain port, a source port, a gate port, and a body port. The drain port of the transistor N1 can be coupled to the pad P1. The source port of the transistor N1 can be coupled to a transistor N2, which is described below. The gate port of the transistor N1 can be coupled to a circuit CKTA, which is described below. The body port of the transistor N1 can be coupled to a ground node VSS, which is described below. The transistor N1 can include a substrate SUB1. The body port of the transistor N1 can be coupled (directly) to the substrate SUB1. The substrate SUB1 can be coupled (directly) to the ground node VSS.

The ESD protection circuit includes a transistor N2 coupled to the transistor N1. The transistor N2 may be a similar type of transistor as the transistor N1. In some embodiments, the transistor N2 may be rated for a first voltage and other circuits coupled to the pad P1 may be rated for a second voltage that is higher than the first voltage. In other words, an operation voltage of the transistor N2 may be lower than an operational voltage for the pad P1. In some embodiments, a ratio of an operation voltage of the transistor N2 and an operation voltage of the pad P1 is 0.85, less than 0.85, 0.7, less than 0.7, 0.5, less than 0.5, or any other value or range between 0 and 1. In some embodiments, the transistor N2 is rated for 1.2V (e.g., N2 is a process specified 1.2V device) and the pad P1 is rated for 1.8V. The transistor N2 and the pad P1 can be rated for any other voltage values or ranges without departing from the scope of the present disclosure.

The drain port of the transistor N2 can be coupled to the transistor N1. The source port of the transistor N2 can be coupled to the ground node VSS. The gate port of the transistor N2 can be coupled to the ground node VSS. In some embodiments, the gate port of the transistor N2 is coupled to a tie-low cell. The source port of the transistor N2 and the body port of the transistor N2 can be coupled to the ground node VSS. The transistor N2 can include the substrate SUB1. In other words, the transistor N2 can share the substrate SUB1 with the transistor N1. The body port of the transistor N2 can be coupled (directly) to the substrate SUB1.

The transistors N1 and N2 may be designed, configured, and operated to protect the ESD-sensitive circuit during an ESD event. In some embodiments, when an ESD pulse is applied to the pad P1, a parasitic negative-positive-negative (NPN) bipolar transistor NPN1 in the substrate SUB1 of the transistors N1 and N2 is turned on, creating a discharge path in the substrate SUB1 for the ESD pulse. The ESD pulse can be referred to as an ESD signal. The parasitic transistor NPN1 can be turned on when a substrate current (Isub) flows through a well resistance (Rb) to generate a voltage greater than a threshold at a node where NPN1 couples to Rb. The parasitic transistor NPN1 can be referred to as embedded in the transistors N1 and N2 or embedded in the substrate of the transistors N1 and N2. Although NPN1 is an NPN bipolar transistor, the ESD protection circuit 100 can include a positive-negative-positive (PNP) bipolar transistor while remaining in the scope of the present disclosure. The resulting ESD voltage potential across the pad P1 and another terminal (such as a VSS node) can be lower than without the transistors N1 and N2.

In some embodiments, the transistors N1 and N2 are a stack of two transistors. In some embodiments, the transistor N1 is a cascode transistor and the transistor N2 is a common source transistor. Although N1 and N2 are a stack of two transistors, N1 and N2 can be a part of a stack of more than two transistors without departing from the scope of the present disclosure.

The ESD protection circuit 100 includes a circuit CKTA coupled on one end to a gate of N1 and on the other end to a node VDD. The VDD node may be referred to as a power rail node or power rail terminal. The node VDD may be (e.g., selectively) coupled to a power rail (e.g., power supply) that provides a supply voltage to the node VDD. The CKTA may be designed, configured, and operated to protect the transistor N1 during a pad-to-power ESD event. A pad-to-power ESD event can be defined as an ESD pulse being applied to the pad P1 and causing a discharge path from the pad P1 to the node VDD. In some embodiments, during a pad-to-power ESD event, the node VDD is connected to the power rail, ground rail, or any low-impedance source. In some embodiments, during a pad-to-power ESD event, other terminals, such as the node VSS, are floating.

The ESD protection circuit 100 includes a circuit CKTB coupled on one end to the node VDD and on the other end to a node VSS. The node VSS may be referred to as a ground rail node or a ground rail terminal. The node VSS may be (e.g., selectively) coupled to a ground rail that supplies a ground voltage to the node VSS. The CKTB may be designed, configured, and operated to protect the ESD-sensitive circuit during a pad-to-ground ESD event. A pad-to-ground ESD event can be defined as an ESD pulse being applied to the pad P1 and causing a discharge path from the pad P1 to the node VSS. In some embodiments, during a pad-to-ground ESD event, the node VSS is connected to the ground rail, power rail, or any low-impedance source. In some embodiments, during a pad-to-ground ESD event, other terminals, such as the node VDD, are floating.

Disclosed herein is operation of the ESD protection circuit 100 during a pad-to-power ESD event. In some embodiments, an ESD pulse is applied at the pad P1. In some embodiments, the VSS node is coupled to a ground rail. A voltage at the pad P1 may rise. In some embodiments, the VDD node is floating. In some embodiments, the gate voltage of N1 tracks the pad voltage of P1. That is, a voltage of the gate of N1 may maintain a fixed voltage offset from a voltage of the pad P1. Thus, the voltage at the gate of N1 rises. In some embodiments, after the gate of N1 reaches a first voltage level, the circuit CKTA is enabled. In some embodiments, a current from the ESD pulse discharges through CKTA to the VDD node. Discharging a current can be referred to as sinking a current. In some embodiments, after CKTA is enabled, the gate voltage of N1 tracks the VDD node voltage. That is, a voltage of the gate of N1 may maintain a fixed voltage offset from a voltage of the VDD node. In some embodiments, a parasitic transistor NPN1 in the substrate SUB1 of the transistors N1 and N2 turns on and discharges current from the ESD pulse. In some embodiments, because the gate voltage of N1 tracks the VDD node voltage, the parasitic transistor NPN1 in the substrate SUB1 of the transistors N1 and N2 can discharge more current than when the gate voltage of N1 tracks the pad voltage of P1. This may be because a voltage of the gate of N1 is lower when the gate voltage of N1 tracks the VDD node voltage. The lower voltage of the gate of N1 can cause a greater voltage difference between the drain of N1 and the gate of N1, which can induce a greater substrate current Isub through gate-induced drain leakage (GIDL). By discharging more current via the substrate SUB1, the ESD protection circuit 100 can reduce a voltage across ESD-sensitive circuits coupled between the pad P1 and the VDD node.

In some embodiments, coupling CKTA between the VDD node and the gate of N1 is advantageous as compared to directly coupling the VDD node to the gate of N1. In some embodiments, CKTA can prevent the gate-source junction or the gate-drain junction of the N1 transistor from exceeding a voltage breakdown level by absorbing some of the voltage difference between the pad P1 and the VDD node.

Disclosed herein is operation of the ESD protection circuit 100 during a pad-to-ground ESD event. In some embodiments, an ESD pulse is applied at the pad P1. In some embodiments, the VSS node is coupled to a ground rail. In some embodiments, the VDD node is floating. In some embodiments, the gate voltage of N1 tracks the pad voltage of P1. That is, a voltage of the gate of N1 may maintain a fixed voltage offset from a voltage of the pad P1. In some embodiments, after the gate of N1 reaches a first voltage level, the circuit CKTA is enabled and CKTB are enabled. In some embodiments, current from the ESD pulse discharges through CKTA and CKTB to the VSS node. In some embodiments, after CKTA and CKTB are enabled, the gate voltage of N1 tracks the VSS node voltage. That is, a voltage of the gate of N1 may maintain a fixed voltage offset from a voltage of the VSS node. In some embodiments, a parasitic NPN transistor in the substrate SUB1 of the transistors N1 and N2 turns on and discharges current from the ESD pulse. In some embodiments, because the gate voltage of N1 tracks the VSS node voltage, the parasitic NPN transistor in the substrate SUB1 of the transistors N1 and N2 can discharge more current than when the gate voltage of N1 tracks the pad voltage of P1. This may be because a voltage of the gate of N1 is lower when the gate voltage of N1 tracks the VSS node voltage. By discharging more current via the substrate SUB1, the ESD protection circuit 100 can reduce a voltage across ESD-sensitive circuits coupled between the pad P1 and the VSS node.

Figure 2:
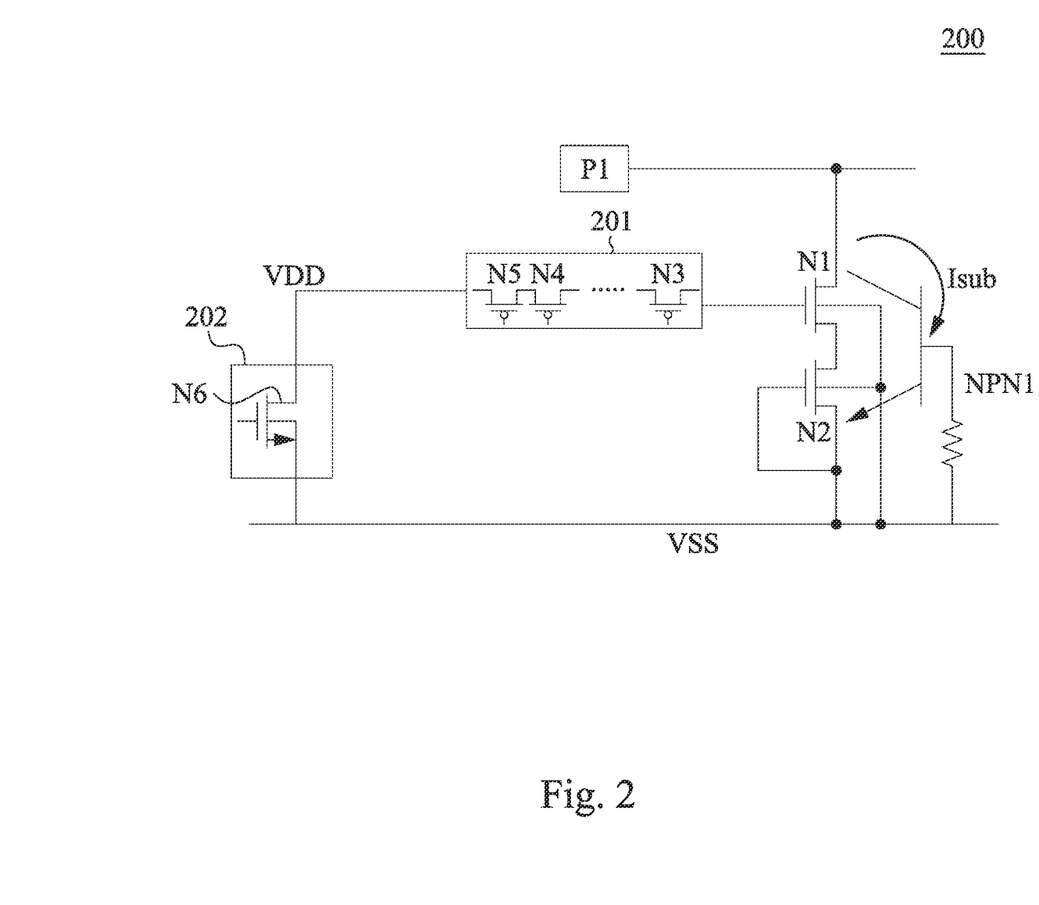
FIG. 2 illustrates an ESD protection circuit, in accordance with some embodiments of the present disclosure.

FIG. 2 illustrates an ESD protection circuit 200, in accordance with some embodiments of the present disclosure. In some embodiments, the ESD protection circuit 200 is an implementation of the ESD protection circuit 100 of FIG. 1. In some embodiments, CKTA of FIG. 1 includes a stack of transistors 201. In some embodiments, the stack of transistors 201 includes transistors N3, N4, and N5, although the stack of transistors 201 can include greater than or less than three transistors while remaining the scope of the present disclosure. In some embodiments, a drain of the transistor N3 is coupled to the gate of the N1 transistor. In some embodiments, a source of the transistor N3 is coupled to a drain of the transistor N4 and a source of the transistor N4 is coupled to a drain of the transistor N5. In some embodiments, a gate of each of the transistors N3, N4, and N5 are (directly) coupled to the VSS node. In some embodiments, a gate of each of the transistors N3, N4, and N5 are coupled to the VSS node via a respective tie-low cell.

In some embodiments, CKTB of FIG. 1 includes an ESD clamp 202. In some embodiments, the ESD clamp 202 includes a transistor N6. In some embodiments, a drain of the transistor N6 is coupled to a source of the transistor N5. In some embodiments, a source of the transistor N6 is coupled to the VSS node. In some embodiments, the gate of the transistor N6 is floating. In some embodiments, the gate of the transistor N6 is coupled to the drain of the transistor N6 by a parasitic capacitance.

Figure 3:
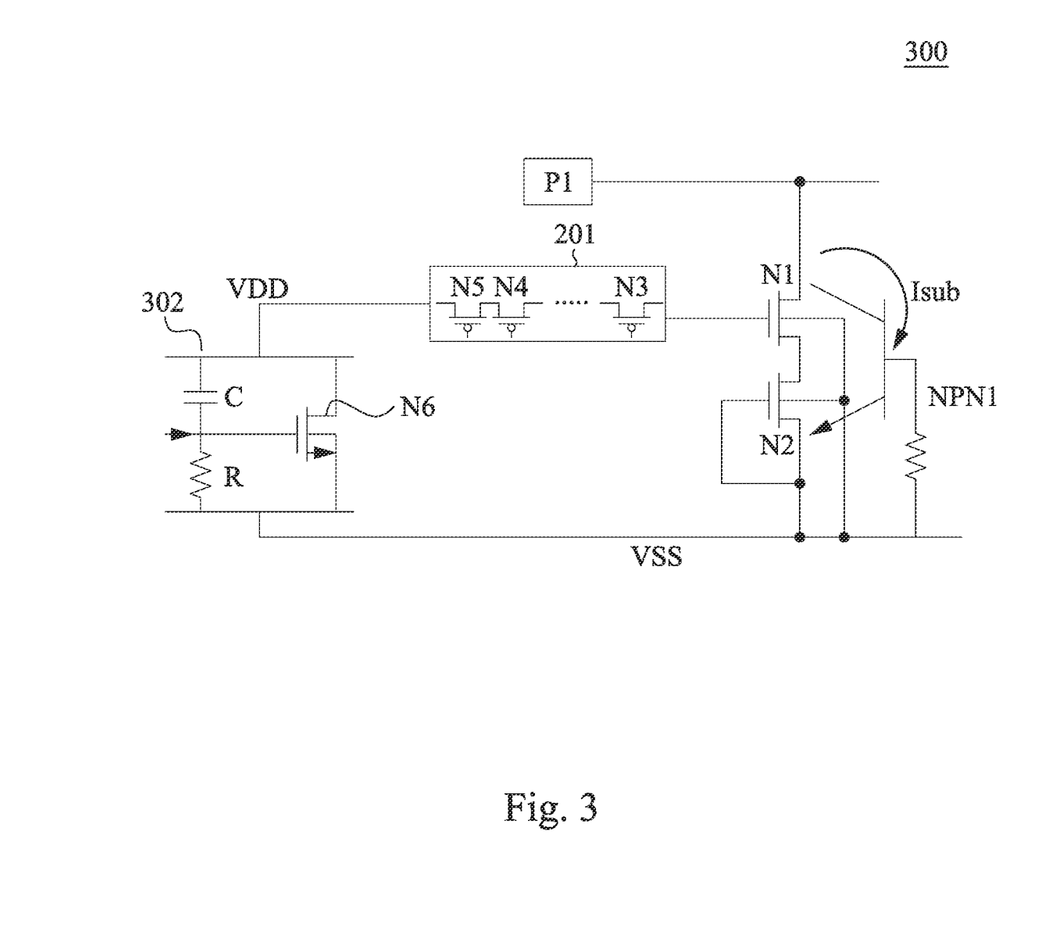
FIG. 3 illustrates an ESD protection circuit, in accordance with some embodiments of the present disclosure.

FIG. 3 illustrates an ESD protection circuit 300, in accordance with some embodiments of the present disclosure. The ESD protection circuit 300 similar to the ESD protection circuit 200 of FIG. 2 except that the ESD clamp 302 of the ESD protection circuit 200 includes a capacitor C and a resistor R. Advantageously, the ESD clamp 302 can selectively turn on based on a resistor-capacitor (RC) time constant associated with the capacitor C and the resistor R. Thus, the ESD clamp 302 can turn on for a pad-to-ground ESD event but not for non-ESD operation.

In some embodiments, the capacitor C and the resistor R are discrete components. In some embodiments, the capacitor C and the resistor R are external to the transistor N6. In other words, in some embodiments, the capacitor C and the resistor R are not a parasitic C and a parasitic R, respectively. In some embodiments, the capacitor C is coupled between the gate of the transistor N6 and the drain of the transistor N6. In some embodiments, the resistor R is coupled between the gate of the transistor N6 and the source of the transistor N6.

In some embodiments, the RC time constant of the ESD clamp 302 is less than an RC time constant of a non-ESD event and greater than an RC time constant of an ESD event such as the pad-to-ground ESD event. In other words, in some embodiments, the RC time constant of the ESD clamp 302 is less than an RC time constant of a signal associated with a non-ESD event and greater than an RC time constant of a signal associated with an ESD event such as the pad-to-ground ESD event. In some embodiments, the ESD clamp 302 is enabled when the gate of the transistor N6 receives a signal having an RC time constant that is less than the RC time constant of the ESD clamp 302. In some embodiments, the ESD clamp 302 is remains disabled when the gate of the transistor N6 receives a signal having an RC time constant that is greater than the RC time constant of the ESD clamp 302. Although the ESD clamp 302 is shown as having an RC time constant that can turn on for a pad-to-ground ESD event but not for non-ESD operation, the ESD clamp 202 of FIG. 2 can also have an RC time constant that can turn on for a pad-to-ground ESD event but not for non-ESD operation based on parasitic capacitances and resistances of the ESD clamp 202.

Figure 4:
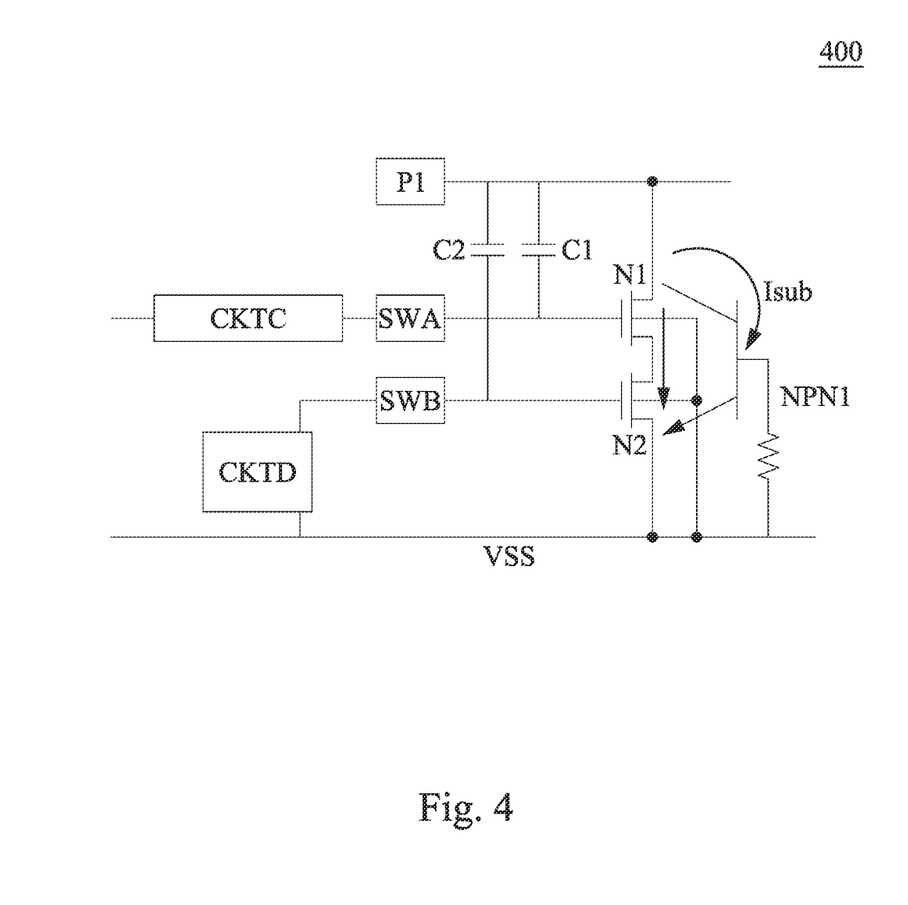
FIG. 4 illustrates an ESD protection circuit, in accordance with some embodiments of the present disclosure.

FIG. 4 illustrates an ESD protection circuit 400, in accordance with some embodiments of the present disclosure. The ESD protection circuit 400 is similar to the ESD protection circuit 100 except that the ESD protection circuit 100 includes switches SWA and SWB at the gates of N1 and N2, respectively. Advantageously, the switches SWA and SWB of the ESD protection circuit 400 can allow the gates of N1 and N2 to float during a pad-to-ground ESD event, which can further protect ESD-sensitive circuits during such an event.

In some embodiments, the switches SWA and SWB can selectively turn off based on a resistor-capacitor (RC) time constant associated with parasitic resistors and parasitic capacitors in the switches SWA and SWB. In some embodiments, the RC time constant of the switches SWA and SWB is less than an RC time constant of a non-ESD event and greater than an RC time constant of an ESD event such as the pad-to-ground ESD event. In other words, in some embodiments, the RC time constant of the switches SWA and SWB is less than an RC time constant of a signal associated with a non-ESD event and greater than an RC time constant of a signal associated with an ESD event such as the pad-to-ground ESD event. In some embodiments, the switches SWA and SWB are disabled when the gate of the transistor N1 and the gate of the transistor N2 receive a signal, such as a signal of an ESD event, having an RC time constant that is less than the RC time constant of the switches SWA and SWB. In some embodiments, the switches SWA and SWB are enabled when the gate of the transistor N1 and the gate of the transistor N2 receive a signal, such as a signal during non-ESD operation, having an RC time constant that is greater than the RC time constant of the switches SWA and SWB.

Disclosed herein is operation of the ESD protection circuit 100 during a pad-to-ground ESD event. In some embodiments, an ESD pulse is applied at the pad P1. In some embodiments, the VSS node is coupled to a ground rail. In some embodiments, the RC time constant of the ESD pulse is lower than the time constant of the switches SWA and SWB. In some embodiments, the gate of the transistor N1 and gate of the transistor N2 receive the ESD pulse. In some embodiments, the switches SWA and SWB are disabled based on the gate of the transistor N1 and gate of the transistor N2 receiving the ESD pulse.

In some embodiments, as a result of disabling the switches SWA and SWB, the gate voltage of the transistor N1 and gate voltage of the transistor N2 track the pad voltage of P1. That is, a voltage of the gate of N1 may maintain a first fixed voltage offset from a voltage of the pad P1 and voltage of the gate of N2 may maintain a second fixed voltage offset from a voltage of the pad P1. The gate voltage of N1 and the gate voltage of N2 can track the pad voltage of P1 because of coupling via parasitic capacitors C1 and C2, respectively. The parasitic capacitor C1 can be coupled between the gate of N1 and the pad P1, and the parasitic capacitor C2 can be coupled between the gate of N2 and the pad P1.

In some embodiments, a parasitic NPN transistor in the substrate SUB1 of the transistors N1 and N2 turns on and discharges current from the ESD pulse. In some embodiments, because both the gate of the transistor N1 and the gate of transistor N2 track the pad P1, the parasitic NPN transistor in the substrate SUB1 of the transistors N1 and N2 can discharge more current than when only the gate voltage of N1 tracks the pad voltage of P1. This may be due to a channel current through N1 and N2, which can cause ionization, which can induce the substrate current Isub. By discharging more current via the substrate SUB1, the ESD protection circuit 100 can reduce a voltage across ESD-sensitive circuits coupled between the pad P1 and the VSS node.

Figure 5:
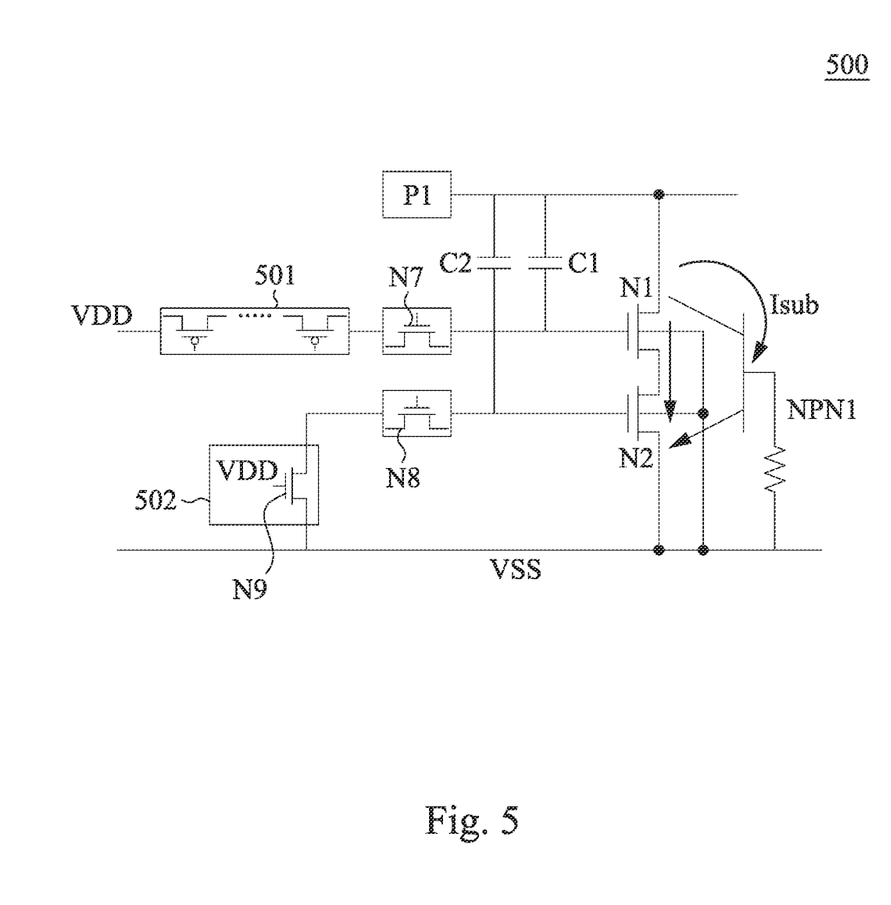
FIG. 5 illustrates an ESD protection circuit, in accordance with some embodiments of the present disclosure.

FIG. 5 illustrates an ESD protection circuit 500, in accordance with some embodiments of the present disclosure. In some embodiments, the ESD protection circuit 500 is an implementation of the ESD protection circuit 400 of FIG. 4. In some embodiments, the switch SWA includes a transistor N7. In some embodiments, the switch SWB includes a transistor N8. The transistors N7 and N8 can be NMOS or PMOS transistors. In some embodiments, the circuit CKTC of FIG. 4 includes a stack of transistors 501. The stack of transistors 501 may be similar to the stack of transistors 201 of FIG. 2. The stack of transistors 501 can be coupled on one end to the switch SWA and on the other end to the VDD node. In some embodiments, the circuit CKTD of FIG. 4 includes a tie-low cell 502. The tie-low cell 502 can include a transistor N9. A drain of the transistor N9 can be coupled to the switch SWB. A source of the transistor N9 can be coupled to the VSS node. A gate of the transistor N9 can be coupled to the VDD node. In some embodiments, the gate of the transistor N9 is directly coupled to the VDD node. In some embodiments, the gate of the transistor N9 is coupled to the VDD node via another transistor. In some embodiments, the transistor N9 is an NMOS transistor. In some embodiments, the other transistor is a diode connected PMOS transistor.

Figure 6:
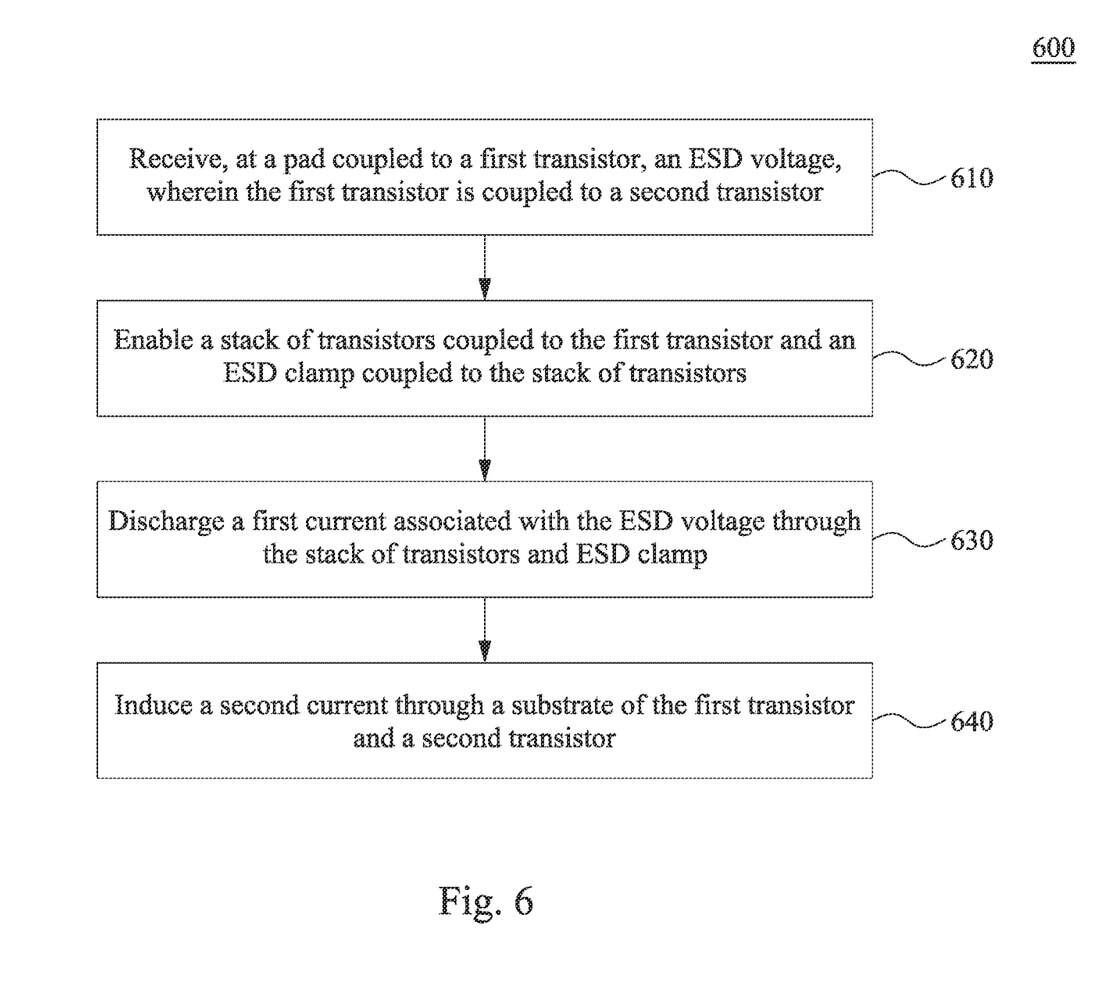
FIG. 6 illustrates a flowchart of a method to operate the ESD protection circuit of FIG. 1, in accordance with some embodiments of the present disclosure.

FIG. 6 illustrates a flowchart of a method 600 to operate the ESD protection circuit 100, in accordance with some embodiments of the present disclosure. It is noted that the method 600 is merely an example and is not intended to limit the present disclosure. Accordingly, it is understood that additional operations may be provided before, during, and after the method 600 of FIG. 6, and that some other operations may only be briefly described herein. In some embodiments, the method 600 is performed by the ESD protection circuit 100.

At operation 610, in some embodiments, an ESD protection circuit (e.g., the ESD protection circuit 100 of FIG. 1, the ESD protection circuit 200 of FIG. 2, or the ESD protection circuit 300 of FIG. 3) receives, at a pad (e.g., pad P1 of FIG. 1) coupled to a first transistor (e.g., the transistor N1), an ESD voltage. In some embodiments, the gate voltage of the first transistor tracks the pad voltage. In some embodiments, the first transistor is coupled to a second transistor. In some embodiments, the first and second transistor are a stack of two transistors. In some embodiments, the first transistor is a cascode transistor and the second transistor is a common source transistor.

At operation 620, in some embodiments, the ESD protection circuit enables a stack of transistors (e.g., the stack of transistors 201 of FIG. 2) coupled to the first transistor and an ESD clamp (e.g., the ESD clamp 202 of FIG. 2, the ESD clamp 302 of FIG. 3) coupled to the stack of transistors. In some embodiments, the stack of transistors are enabled because a voltage at each source of the stack of transistors increases at least until a voltage difference between each source and a corresponding gate in each transistor (e.g., transistors N3, N4, and N5 in FIG. 2) of the stack of transistors exceeds a threshold voltage to turn on the corresponding transistor in the stack of transistors. In some embodiments, the ESD clamp is enabled because the gate and drain of the transistor (e.g., the transistor N6 of FIG. 2) increases until a voltage difference between the gate and the source of the transistor in the ESD clamp exceeds a threshold voltage to turn on the transistor in the ESD clamp.

At operation 630, in some embodiments, the ESD protection circuit discharges a first current associated with the ESD voltage through the stack of transistors and ESD clamp. In some embodiments, the ESD protection circuit causes a gate of the first transistor voltage to track ground voltage (e.g., the voltage of the VSS node of FIG. 1) that is coupled to the ESD clamp.

At operation 640, in some embodiments, the ESD protection circuit induces a second current (e.g., Isub of FIG. 1) through a substrate (e.g., SUB1 of FIG. 1) of the first transistor and a second transistor coupled to the first transistor. In some embodiments, the ESD protection circuit induces the second current via gate induced drain-to-substrate leakage.

Figure 7:
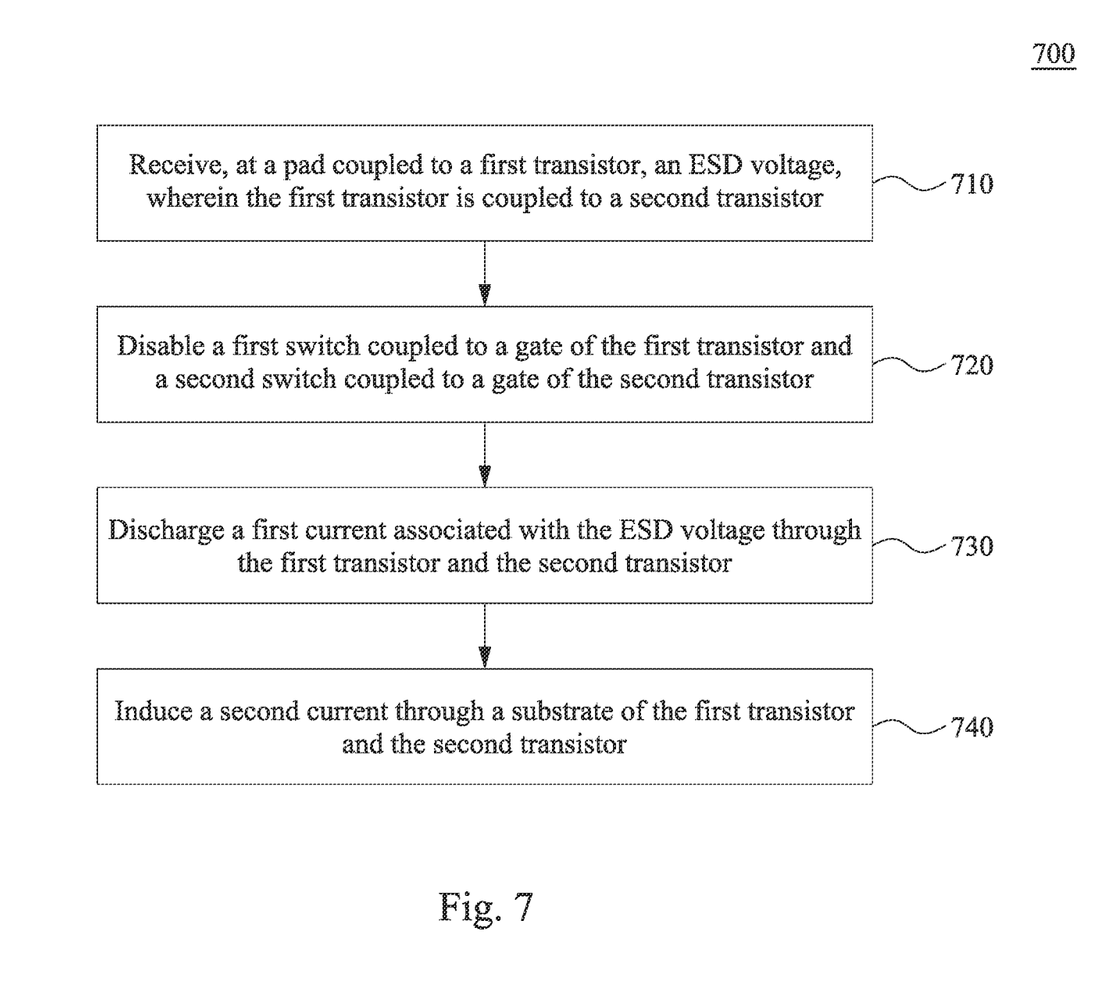
FIG. 7 illustrates a flowchart of a method to operate the ESD protection circuit of FIG. 4, in accordance with some embodiments of the present disclosure.

FIG. 7 illustrates a flowchart of a method 700 to operate the ESD protection circuit 400, in accordance with some embodiments of the present disclosure. It is noted that the method 700 is merely an example and is not intended to limit the present disclosure. Accordingly, it is understood that additional operations may be provided before, during, and after the method 700 of FIG. 7, and that some other operations may only be briefly described herein. In some embodiments, the method 700 is performed by the ESD protection circuit 400.

At operation 710, in some embodiments, an ESD protection circuit (e.g., the ESD protection circuit 400 of FIG. 4 or the ESD protection circuit 500 of FIG. 5) receives, at a pad (e.g., pad P1 of FIG. 4) coupled to a first transistor (e.g., the transistor N1 of FIG. 4), an ESD voltage. In some embodiments, the first transistor is coupled to a second transistor (e.g., the transistor N2 of FIG. 4). In some embodiments, the first and second transistor are a stack of two transistors. In some embodiments, the first transistor is a cascode transistor and the second transistor is a common source transistor.

At operation 720, in some embodiments, the ESD protection circuit disables a first switch (e.g., the switch SWA of FIG. 4) coupled to a gate of the first transistor and a second switch (e.g., the switch SWB of FIG. 4) coupled to a gate of the second transistor. In some embodiments, the first switch is disabled because a voltage at the source of the first switch increases at least until a voltage difference between a gate of the first switch and a source of the first switch goes below a threshold voltage. In some embodiments, the second switch is disabled because a voltage at the source of the second switch increases at least until a voltage difference between a gate of the second switch and a source of the second switch goes below a threshold voltage.

At operation 730, in some embodiments, the ESD protection circuit discharges a first current associated with the ESD voltage through the first transistor and the second transistor. In some embodiments, the ESD protection circuit causes a gate voltage of the first transistor and a gate voltage of the second transistor to track the pad voltage.

At operation 740, in some embodiments, the ESD protection circuit induces a second current (e.g., Isub of FIG. 1) through a substrate (e.g., SUB1 of FIG. 1) of the first transistor and a second transistor coupled to the first transistor. In some embodiments, the ESD protection circuit induces the second current via ionization caused by the first current.

Figure 8:
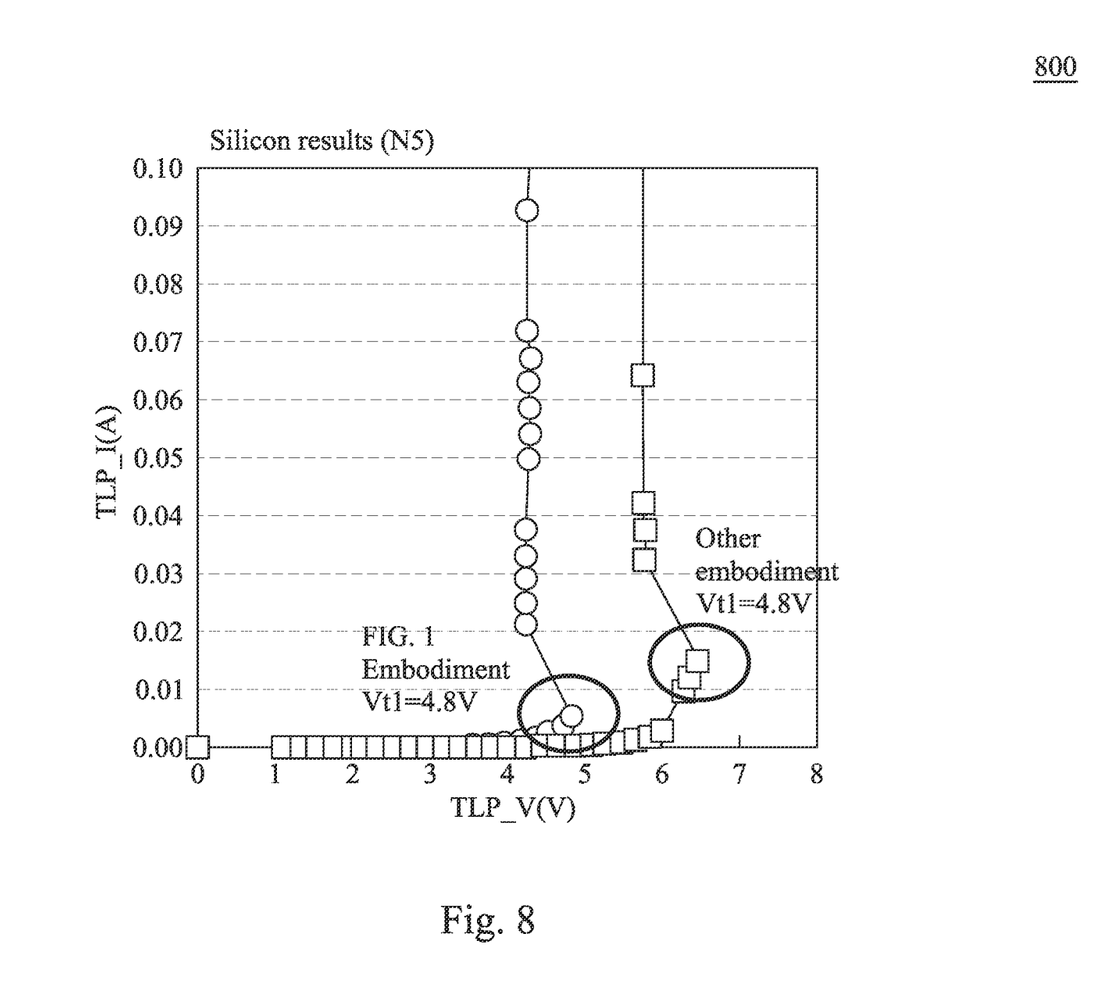
FIG. 8 illustrates a performance comparison plot, in accordance with some embodiments of the present disclosure.

FIG. 8 illustrates a performance comparison plot 800, in accordance with some embodiments of the present disclosure. The comparison plot 800 shows a current-voltage (IV) curve for two different embodiments during an ESD event. The plotted voltage represents the voltage across the pad and the ground. The embodiment plotted on the left is the embodiment of FIG. 1, in which N1 gate tracks VSS. The embodiment plotted on the right is an embodiment that lacks the improvements disclosed herein, which is referred to as "other embodiment," in which N1 gate tracks the pad (without improvements of the embodiment of FIG. 4). The embodiment of FIG. 1 shows a maximum voltage 4.8V and the other embodiment shows a maximum voltage of 6.4V. Thus, the embodiment of FIG. 1 improves the voltage across the pad and the ground by 1.6V. The maximum voltage is referred to as "Vt1" in the plot 800.

In some aspects of the present disclosure, an electrostatic discharge (ESD) protection circuit is disclosed. In some aspects, the ESD protection circuit includes a first transistor coupled to a pad, a second transistor coupled between the first transistor and ground, a stack of transistors coupled to the first transistor, and an ESD clamp coupled between the stack of transistors and the ground.

In some embodiments, the ESD clamp has a resistor-capacitor (RC) time constant that is less than an RC time constant of a non-ESD event and greater than an RC time constant of an ESD event. In some embodiments, a ratio of an operation voltage of each of the first and second transistors and an operation voltage of the pad is less than 0.85.

In some embodiments, a gate of the second transistor is coupled to the ground. In some embodiments, a gate of the second transistor is coupled to a tie-low circuit.

In some embodiments, the stack of transistors includes a third transistor, a fourth transistor, and a fifth transistor, wherein a source of the third transistor is coupled to a drain of the fourth transistor, and wherein a source of the fourth transistor is coupled to a drain of the fifth transistor. In some embodiments, a drain of the stack of transistors is coupled to a gate of the first transistor and a source of the stack of transistors is coupled to the ESD clamp. In some embodiments, each gate of the stack of transistors is coupled to the ground.

In some embodiments, the ESD clamp includes a third transistor, wherein a drain of the third transistor is coupled to the stack of transistors and the source of the third transistor is coupled to the ground. In some embodiments, the ESD clamp includes a capacitor coupled between a gate of the third transistor and the drain of the third transistor, and a resistor coupled between the gate of the third transistor and the source of the third transistor. In some embodiments, a node between the stack of transistors and the ESD clamp is coupled to a voltage supply during non-ESD operation and is floating during a pad-to-ground ESD event.

In some aspects of the present disclosure, an electrostatic discharge (ESD) protection circuit is disclosed. In some aspects, the ESD protection circuit includes a first transistor coupled to a pad, a second transistor coupled between the first transistor and ground, a first switch coupled to a gate of the first transistor, and a second switch coupled to a gate of the second transistor.

In some embodiments, the first switch and the second switch have a resistor-capacitor (RC) time constant that is less than an RC time constant of a non-ESD event and greater than an RC time constant of an ESD event. In some embodiments, the ESD protection circuit further includes a first parasitic capacitance coupled between the gate of the first transistor and the pad, and a second parasitic capacitance coupled between the gate of the second transistor and the pad.

In some embodiments, each of the first switch and the second switch is an N-type metal-oxide-semiconductor (NMOS) transistor. In some embodiments, the ESD protection circuit further includes a stack of transistors and an ESD clamp coupled between the first switch and the ground.

In some embodiments, the ESD protection circuit further includes a tie-low cell coupled between the second switch and the ground. In some embodiments, the tie-low cell comprises a third transistor, a drain of the third transistor coupled to the second switch, a source of the third transistor coupled to the ground, and a gate of the third transistor coupled to a power rail.

In some aspects of the present disclosure, a method for operating an electrostatic discharge (ESD) protection circuit is disclosed. In some aspects, the method includes receiving, at a pad coupled to a first transistor, an ESD voltage, enabling a stack of transistors coupled to the first transistor and an ESD clamp coupled to the stack of transistors, discharging a first current associated with the ESD voltage through the stack of transistors and ESD clamp, and inducing a second current through a substrate of the first transistor and a second transistor coupled to the first transistor.

In some embodiments, the method further includes causing a voltage of a gate of the first transistor to track a voltage of a ground. In some embodiments, the ground is coupled to the ESD clamp.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An electrostatic discharge (ESD) protection circuit comprising:
   a first transistor coupled to a pad;
   a second transistor coupled between the first transistor and ground;
   a stack of transistors coupled to the first transistor; and
   an ESD clamp coupled between the stack of transistors and the ground.

2. The ESD protection circuit of claim 1, wherein the ESD clamp has a resistor-capacitor (RC) time constant that is less than an RC time constant of a non-ESD event and greater than an RC time constant of an ESD event.

3. The ESD protection circuit of claim 1, wherein a ratio of an operation voltage of each of the first and second transistors and an operation voltage of the pad is less than 0.85.

4. The ESD protection circuit of claim 1, wherein a gate of the second transistor is coupled to the ground.

5. The ESD protection circuit of claim 1, wherein a gate of the second transistor is coupled to a tie-low circuit.

6. The ESD protection circuit of claim 1, wherein the stack of transistors comprises a third transistor, a fourth transistor, and a fifth transistor, wherein a source of the third transistor is coupled to a drain of the fourth transistor, and wherein a source of the fourth transistor is coupled to a drain of the fifth transistor.

7. The ESD protection circuit of claim 1, wherein a drain of the stack of transistors is coupled to a gate of the first transistor and a source of the stack of transistors is coupled to the ESD clamp.

8. The ESD protection circuit of claim 1, wherein each gate of the stack of transistors is coupled to the ground.

9. The ESD protection circuit of claim 1, wherein the ESD clamp comprises a third transistor, wherein a drain of the third transistor is coupled to the stack of transistors and the source of the third transistor is coupled to the ground.

10. The ESD protection circuit of claim 9, wherein the ESD clamp comprises:
    a capacitor coupled between a gate of the third transistor and the drain of the third transistor; and
    a resistor coupled between the gate of the third transistor and the source of the third transistor.

11. The ESD protection circuit of claim 1, wherein a node between the stack of transistors and the ESD clamp is coupled to a voltage supply during non-ESD operation and is floating during a pad-to-ground ESD event.

12. An electrostatic discharge (ESD) protection circuit comprising:
    a first transistor coupled to a pad;
    a second transistor coupled between the first transistor and ground;
    a first switch coupled to a gate of the first transistor;
    a second switch coupled to a gate of the second transistor; and
    a stack of transistors and an ESD clamp coupled between the first switch and the ground.

13. The ESD protection circuit of claim 12, wherein the first switch and the second switch have a resistor-capacitor (RC) time constant that is less than an RC time constant of a non-ESD event and greater than an RC time constant of an ESD event.

14. The ESD protection circuit of claim 12, further comprising a first parasitic capacitance coupled between the gate of the first transistor and the pad, and a second parasitic capacitance coupled between the gate of the second transistor and the pad.

15. The ESD protection circuit of claim 12, wherein each of the first switch and the second switch is an N-type metal-oxide-semiconductor (NMOS) transistor.

16. The ESD protection circuit of claim 12, further comprising:
    a tie-low cell coupled between the second switch and the ground.

17. The ESD protection circuit of claim 16, wherein the tie-low cell comprises a third transistor, a drain of the third transistor coupled to the second switch, a source of the third transistor coupled to the ground, and a gate of the third transistor coupled to a power rail.

18. A method for operating an electrostatic discharge (ESD) protection circuit, comprising:
    receiving, at a pad coupled to a first transistor, an ESD voltage,
    enabling a stack of transistors coupled to the first transistor and an ESD clamp coupled to the stack of transistors;
    discharging a first current associated with the ESD voltage through the stack of transistors and ESD clamp; and inducing a second current through a substrate of the first transistor and a second transistor coupled to the first transistor.

19. The method of 18, further comprising:

causing a voltage of a gate of the first transistor to track a voltage of a ground coupled to the ESD clamp.

\* \* \* \* \*